United States Patent [19]

Price et al.

[11] 4,420,819

[45] Dec. 13, 1983

[54] SYSTEM FOR PROCESSING AND STORING TRANSACTION DATA AND FOR TRANSMITTING THE TRANSACTION DATA TO A REMOTE HOST COMPUTER

[75] Inventors: Robert J. Price; Bruce E. Taber, both of El Cajon, Calif.

[73] Assignee: Data Card Corporation, Minnetonka, Minn.

[21] Appl. No.: 243,541

[22] Filed: Mar. 13, 1981

[51] Int. Cl.³ .............................................. G06F 15/20
[52] U.S. Cl. ....................................... 364/900; 364/466
[58] Field of Search ... 364/200 MS File, 900 MS File, 364/466, 567; 177/25

[56] References Cited

U.S. PATENT DOCUMENTS

| | | |
|---|---|---|
| 3,291,232 | 12/1966 | Bell . |
| 3,393,757 | 7/1968 | Tonies . |
| 3,594,735 | 7/1971 | Furlong et al. . |
| 3,612,842 | 10/1971 | Aga et al. . |
| 3,635,297 | 1/1972 | Salava ................................ 177/25 X |
| 3,692,988 | 9/1972 | Dlugos et al. ..................... 177/25 X |
| 3,734,286 | 5/1973 | Simjian . |
| 3,916,386 | 10/1975 | Teixeira et al. ..................... 364/900 |
| 3,938,095 | 2/1976 | Check, Jr. et al. ................. 364/900 |
| 3,951,221 | 4/1976 | Rock ................................... 177/25 X |
| 3,961,747 | 6/1976 | Small et al. . |
| 4,024,380 | 5/1977 | Gunn . |
| 4,051,913 | 10/1977 | Gudea .................................... 177/25 |
| 4,093,999 | 6/1978 | Fuller et al. ......................... 364/900 |
| 4,122,532 | 10/1978 | Dlugos et al. ...................... 364/900 |
| 4,131,946 | 12/1978 | Dlugos ................................ 364/466 |
| 4,135,662 | 1/1979 | Dlugos ............................. 364/466 X |
| 4,138,735 | 2/1979 | Allocca et al. ..................... 364/900 |
| 4,168,533 | 9/1979 | Schwartz ............................ 364/900 |
| 4,180,856 | 12/1979 | Check, Jr. et al. ................. 364/466 |
| 4,204,636 | 5/1980 | Hayman . |
| 4,286,325 | 8/1981 | Dlugos et al. ...................... 364/466 |

*Primary Examiner*—Thomas M. Heckler
*Attorney, Agent, or Firm*—Staas & Halsey

[57] ABSTRACT

A data processing and storage system includes semi-permanent disk storage for storing transaction data relating to a plurality of parcels. The transaction data includes character information data which is read from the parcels and scale data which is provided by an associated parcel register scale system. When the data processing and storage system is interrogated by a remote host computer, the transaction data is read from the disk and transmitted to the remote host computer for further processing.

18 Claims, 18 Drawing Figures

READER SUB

SYSTEM FOR PROCESSING AND STORING TRANSACTION DATA AND FOR TRANSMITTING THE TRANSACTION DATA TO A REMOTE HOST COMPUTER

BACKGROUND OF THE INVENTION

1. Field of the Invention

This invention relates to a system for processing and storing transaction data relating to parcels to be shipped and especially to a system which receives the transaction data and stores the transaction data on a disk for subsequent retrieval. The system has the capability of transmitting the stored data to a remote host computer.

2. Description of the Prior Art

There exist, in the prior art, electronic weighing scale systems tailored to the typical UPS and U.S. Postal Service transactions. Two such prior art systems are the Model PC4 Parcel Register System and the Model PC5 Parcel Register System, both of which are manufactured and sold by the Orbitran Division of Data Card Corporation, Assignee of the present application. The Models PC4 and PC5 are microprocessor based parcel register scale systems which generate permanent records of shipping transactions. The system displays charges for all classes of United Parcel Service (UPS) and optionally for the U.S. Postal Service (USPS) and other services (e.g., Railway Express and Federal Express).

Prior art systems such as the Models PC4 and PC5, are designed to function as independent parcel register systems or to provide automatic control of standard postage meters. While such prior art systems function well for their intended purpose, they are not capable of collating other shipping data (e.g., invoice, destination and inventory data) with the weight and charge data, or of transmitting the stored data to a remote host computer for centralized processing.

There also exist, in the prior art, word processing systems in which the system program is off loaded from a disk or a remote computer. Such systems require the maintenance of a system disk or, alternatively, must be on line to a remote computer.

There is therefore a need in the industry for a system which is capable of storing not only weight and charge data but also other transaction data (such as invoice number, control numbers, department numbers, inventory data, etc.) and which is capable of transmitting the stored transaction data for a plurality of parcels to a remote computer. There is a further need for such a system in which the system program is stored in memory in the system for easy access. There is also a need for such a system which is capable of interfacing with remote computers manufactured by any of a variety of companies.

SUMMARY OF THE INVENTION

An object of the present invention is to provide a system for processing and storing transaction data which overcomes the deficiencies of prior art systems.

In particular, it is an object of the present invention to provide a system for processing and storing weight and charge data together with additional transaction data, which system may be accessed by a remote host computer.

A further object of this invention is to provide a transaction data processing and storage system which is compatible with a large number of remote computers.

A further object of this invention is to provide a data processing and storage system in which the system program is stored in memory and does not have to be off loaded from a disk.

The system of the present invention has a number of novel features, as set forth below. A character reading device (e.g., an OCR wand reader) is employed to read characters on a shipping label affixed to a parcel, and to generate a character information signal including character data which is transmitted to a data processing and storage system. The data processing and storage system includes a magnetic disk for semi-permanent storage; however the character data read by the character reader is not immediately stored on the disk but is instead temporarily stored in a static memory. The data processing and storage system transmits the character data read by the character reader to an associated parcel register scale system (e.g., the Model PC4 Parcel Register System manufactured by the Orbitran Division of Data Card Corporation), which weighs the package and transmits a signal, including both the character data read by the wand and the weight and charge data, to the data processing and storage system. The data processing and storage system compares the character data stored in the static memory to the character data which is received from the parcel register postal system, and determines whether the two sets of data correspond. If the two sets of data correspond, then an acknowledgment signal is sent to the parcel register scale system which actuates a printer to print a label, appropriately increments its ascending or descending registers, and erases its memory. The parcel register scale system then sends an acknowledgement signal to the data processing and storage system and the transaction data is sent to the disk for storage.

At a selected time, a remote host computer interrogates the data processing and storage system which transmits the transaction data stored on the disk for further processing by the remote host computer. The system of the present invention includes a programmable communications interface unit which is adapted to interface with a variety of remote host computers, including computers manufactured by the IBM Corporation.

These together with other objects and advantages, which will become subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
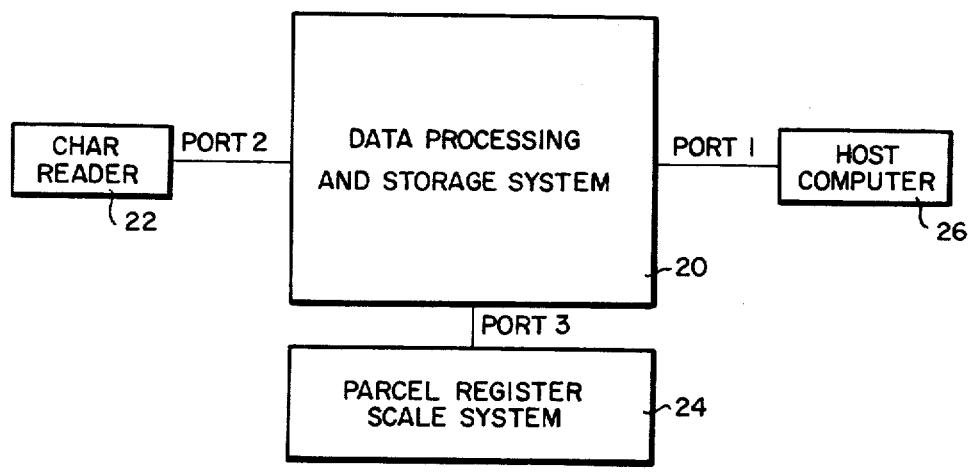
FIG. 1 is a block diagram illustrating the data processing and storage system of the present invention and its connection to a character reader, a parcel register scale system, and a remote host computer.

FIG. 1 illustrates the overall system of the present invention. A data processing and storage system 20 includes a disk for semi-permanent storage of transaction data, including character data and weight and charge data, for a plurality of parcels. In the preferred embodiment, the data processing and storage system 20 is connected to a character reader 22 and a parcel register scale system 24. The character reader 22 is used to read character data from a shipping label on a parcel 25 or from a shipping document and to transmit this character data, as a character information signal, to the data processsing and storage system 20 for subsequent storage. The character reader 22 may be of any type (e.g., an optical character reader (OCR) or a bar code reader,) which is compatible with the coded shipping labels in use. Alternatively, a magnetic code reader, a punch tape reader or a punch card reader may be employed. In the preferred embodiment, the character reader 22 is a wand reader such as the Model No. 40 wand reader manufactured by Recognition Systems, Inc. The character data includes invoice number, zone number, drop point number, class of service, control numbers, zip codes and department numbers associated with a particular shipment. In the preferred embodiment, the parcel register scale system is the Model PC4 Parcel Register System manufactured by the Orbitran Division of Data Card Corporation. The Model PC4 is employed to weigh parcels and to provide scale data, including weight and charge data, to the data processing and storage system 20. Alternatively, the Model PC5 Postal Register System which is also manufactured by the Orbitran Division of Data Card Corporation may be employed as the parcel register scale system 24. A remote host (main frame) computer 26 periodically interrogates the data processing and storage system 20 so that the stored transaction data for a plurality of parcels can be collected for processing by the host computer 26. In general, the system is tailored to the typical UPS and U.S. Postal Service transactions and may be effectively employed by a user having a number of weighing substations and a remote host computer. Each substation includes a data processing and storage system 20, a character reader 22 and a parcel register scale system 24. As noted above, the remote host computer 26 selectively interrogates the data processing and storage system 20 at the various substations.

Figure 2:
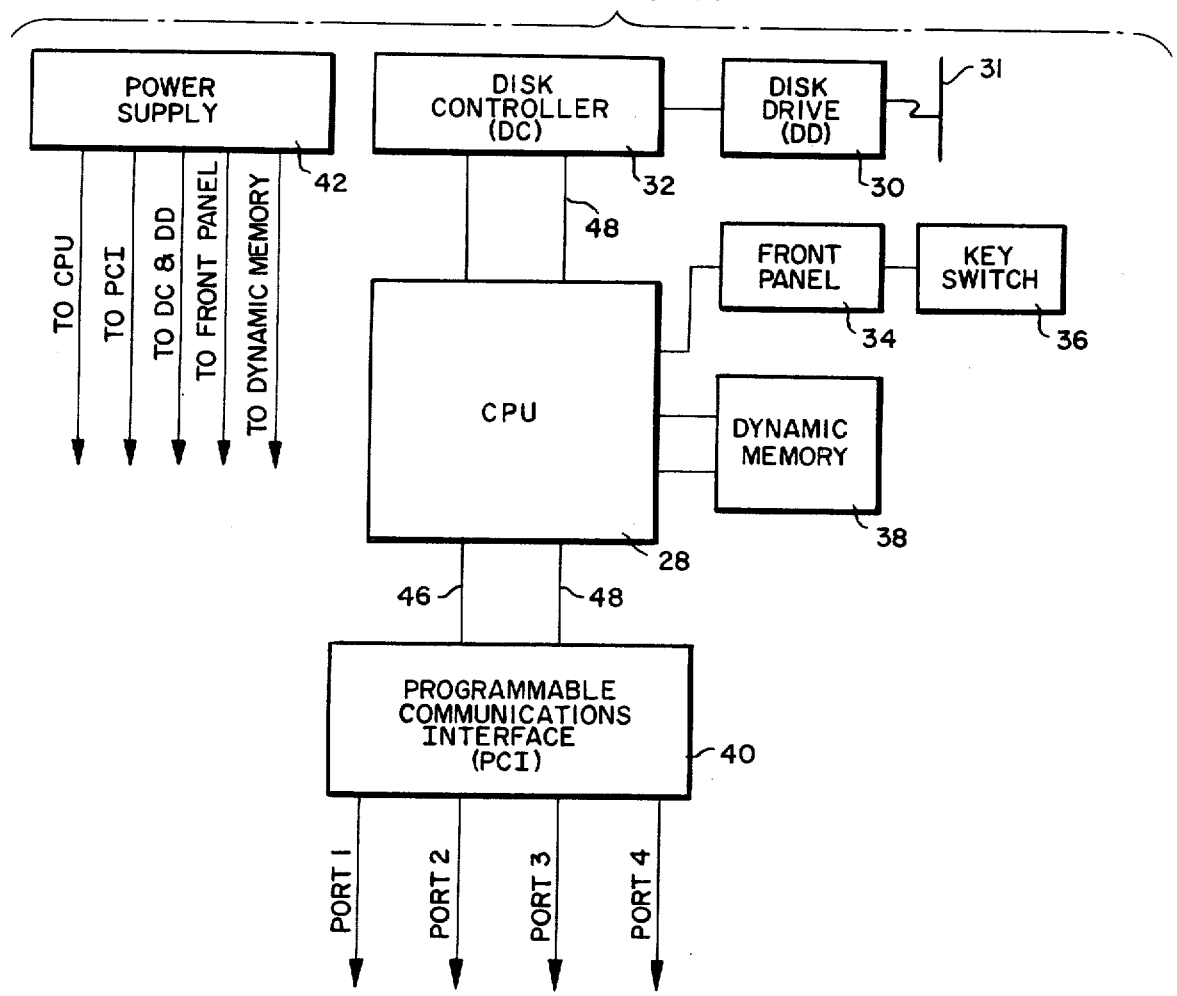
FIG. 2 is a block diagram illustrating the basic components of the data processing and storage system.

Referring to FIG. 2, the basic components of the data processing and storage system 20 of the present invention will be described. A central processing unit (CPU) 28 controls and coordinates the operation of the entire data processing and storage system 20. A disk drive 30 is used to drive a disk 31 which stores transaction data for subsequent transmission to the remote host computer 26. The disk 31 is, for example, a floppy disk or a mini-floppy disk (diskette). Any standard disk drive can be employed as the disk drive 30. In the preferred embodiment, the disk drive 30 is the Model 1015 OEM Floppy Disk Drive manufactured by the Micropolis Corporation. A disk controller 32 controls the transfer of data between the CPU 28 and the disk drive 30. The disk controller 32 receives read and storage signals and data from the CPU 28 and provides a control signal to the disk drive 30. In addition, the disk controller 32 provides a status signal and data to the CPU 28 from the disk drive 30. In the preferred embodiment, the disk controller 32 is a Model number 765 disk controller manufactured by NEC Microcomputers, Inc. A front panel unit 34 includes switches for operator control and an LED display panel for displaying the status of the data processing and storage system 20. A key switch 36 is provided on the front panel 34 so that only authorized (key holding) operators can operate the system and so that an access door to the disk 31 is kept locked, thereby preventing the disk 31 from being accidentally erased. A dynamic memory 38 provides temporary storage for the CPU 28 so that the CPU 28 has the capability of sorting the transaction data, for example, by invoice number. In the preferred embodiment, the dynamic memory 38 comprises a 48K dynamic RAM. A programmable communications interface unit 40 has four EIA RS-232C (hereinafter referred to as RS-232C) I/O ports (port 1 through port 4) for communication between the CPU 28 and external devices. The CPU 28 provides an I/O control signal to control the operation of the programmable communications interface unit 40. In the preferred embodiment, port 1 is connected to the remote host computer 26, port 2 is connected to the character reader 22, port 3 is connected to the parcel register scale system 24 and port 4 is connected to, for example, a printer or a display. In an alternative embodiment, the data processing and storage system 20 is not connected to a remote host computer but is connected to a CRT and a printer for stand alone use. In this embodiment, the data processing and storage system can be employed to generate a daily print out of shipping data (e.g., as required by UPS). A power supply circuit 42 supplies power to the components of the system 20.

Figure 3:
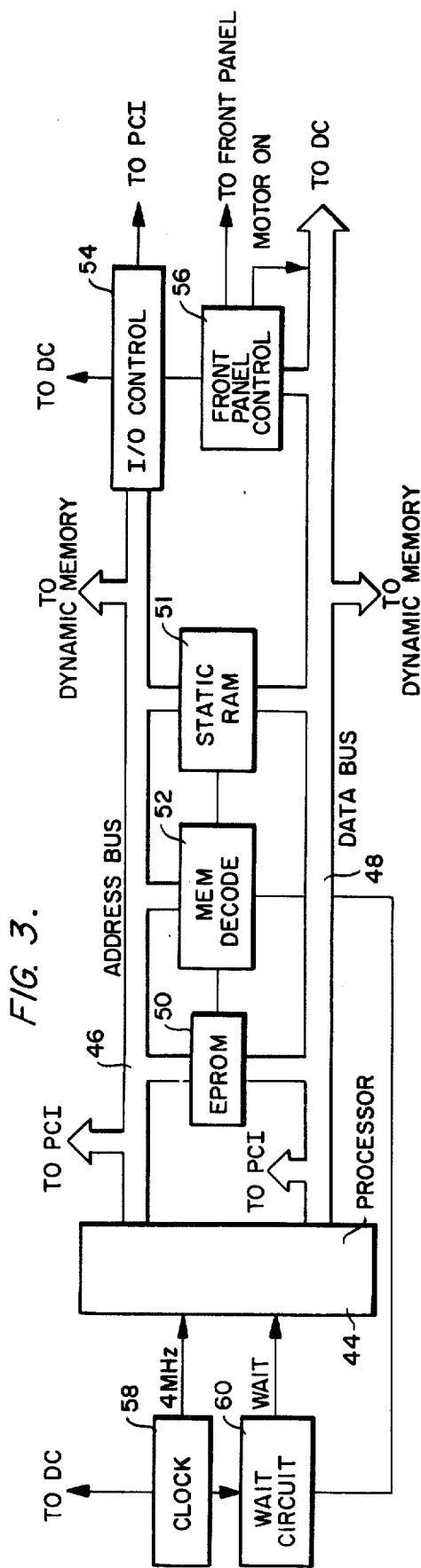
FIG. 3 is a block diagram illustrating the components of the central processing unit 28 of FIG. 2.

Referring to FIG. 3, the details of the central processing unit 28 will be described. As noted above, the CPU 28 controls and coordinates the operation of the entire data processing and storage system 20. The heart of the CPU 28 is a processor 44 which is connected to an address bus 46 and a data bus 48. An erasable programmable read only memory (EPROM) 50 stores the system program. In an alternative embodiment, the program may be stored on a disk and then off-loaded into memory. However, the embodiment including the EPROM 50 is preferred since it provides non-volatile storage of the system program. Thus, system restarts due to memory loss (e.g., those caused by static electricity) are avoided. A static random access memory (RAM) 51 provides a working RAM scratch pad area for the processor 44 to perform its housekeeping functions. In addition, the RAM 51 temporarily stores the character data after it is read in from the character reader 22. A memory decode circuit 52 utilizes the upper five bits of the address bus 46 to decode addresses for the EPROM 50, the static RAM 51 and the dynamic memory 38. An I/O control circuit 54 controls the I/O operations for the programmable communications interface unit 40, the disk controller 32 and a front panel control circuit 56. The front panel control circuit 56 is controlled by the I/O control circuit 54 to read push buttons and to illuminate the LED display on the front panel 34. In addition, the front panel control circuit 56 provides a MOTOR ON signal to the disk controller 32. A clock circuit 58 provides a 4 MHz clock signal to the processor 44 and the clock signal is also divided into 2 MHz, 1 MHz and 0.5 MHz for the disk controller 32. A wait circuit 60 causes a wait state in the processor 44 during an op-code fetch in order to allow sufficient time for access to the EPROM 50. In the preferred embodiment, the wait circuit 150 comprises a pair of dual D-type edge triggered flip-flops (TTL/74LS74).

Figure 9:
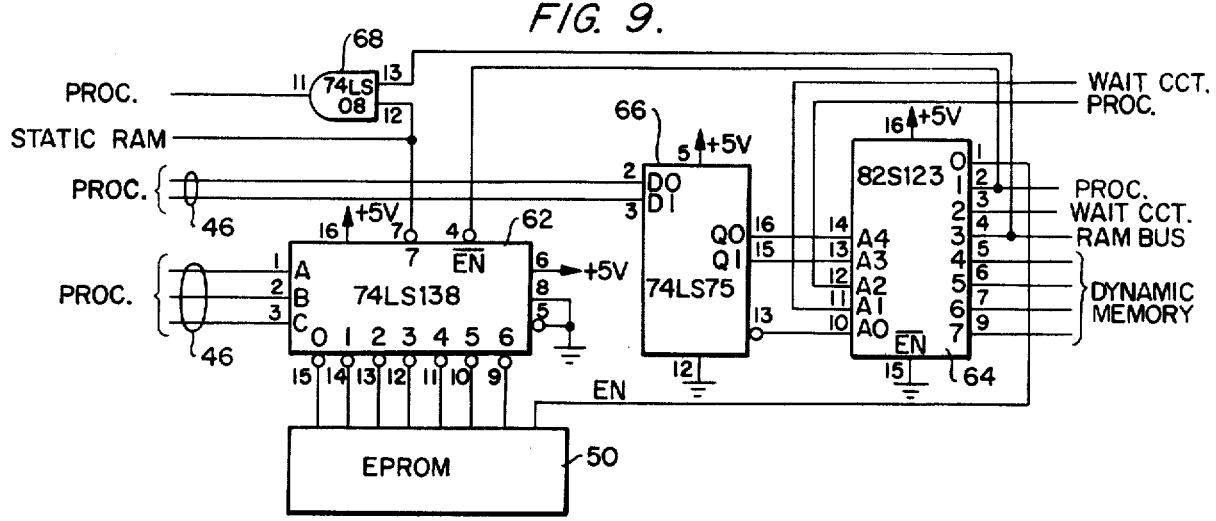
FIG. 9 is a circuit diagram of the memory decode circuit 52 of FIG. 3.

The details of the memory decode circuit 52, the I/O control circuit 54 and the front panel control circuit 56 are described below with reference to FIGS. 9 and 10. The circuit diagram for the memory decode circuit 52 is illustrated in FIG. 9. A 3 to 8 line decoder/multiplexer 62 (TTL/74LS138) receives a select signal from the processor 44 via the high order bits of the address bus 46 and provides enable outputs to the EPROM 50. The enable outputs select one of seven PROM boards in EPROM 50. An EPROM 64 (82S123) is connected to the processor 44, the wait circuit 60, the data bus 48 and the dynamic memory 38. The EPROM 64 provides a signal to enable the EPROM 50 and the dynamic memory 38. The PROM 64 is programmed to act as a memory decoder. A four-bit bi-stable latch 66 (TTL/74LS75) is connected between the processor 44 (via address bus 46) and the PROM 64. The latch 66 is employed to gate out the address bus uncertainty. An AND gate 68 has, as its inputs, an enable output from the 3 to 8 line decoder/multiplexer 62 and the enable signal from PROM 64 to the data bus 48. The AND gate 68 is employed as a negative OR gate to provide an output to the processor 44 when both inputs are low.

Figure 10:
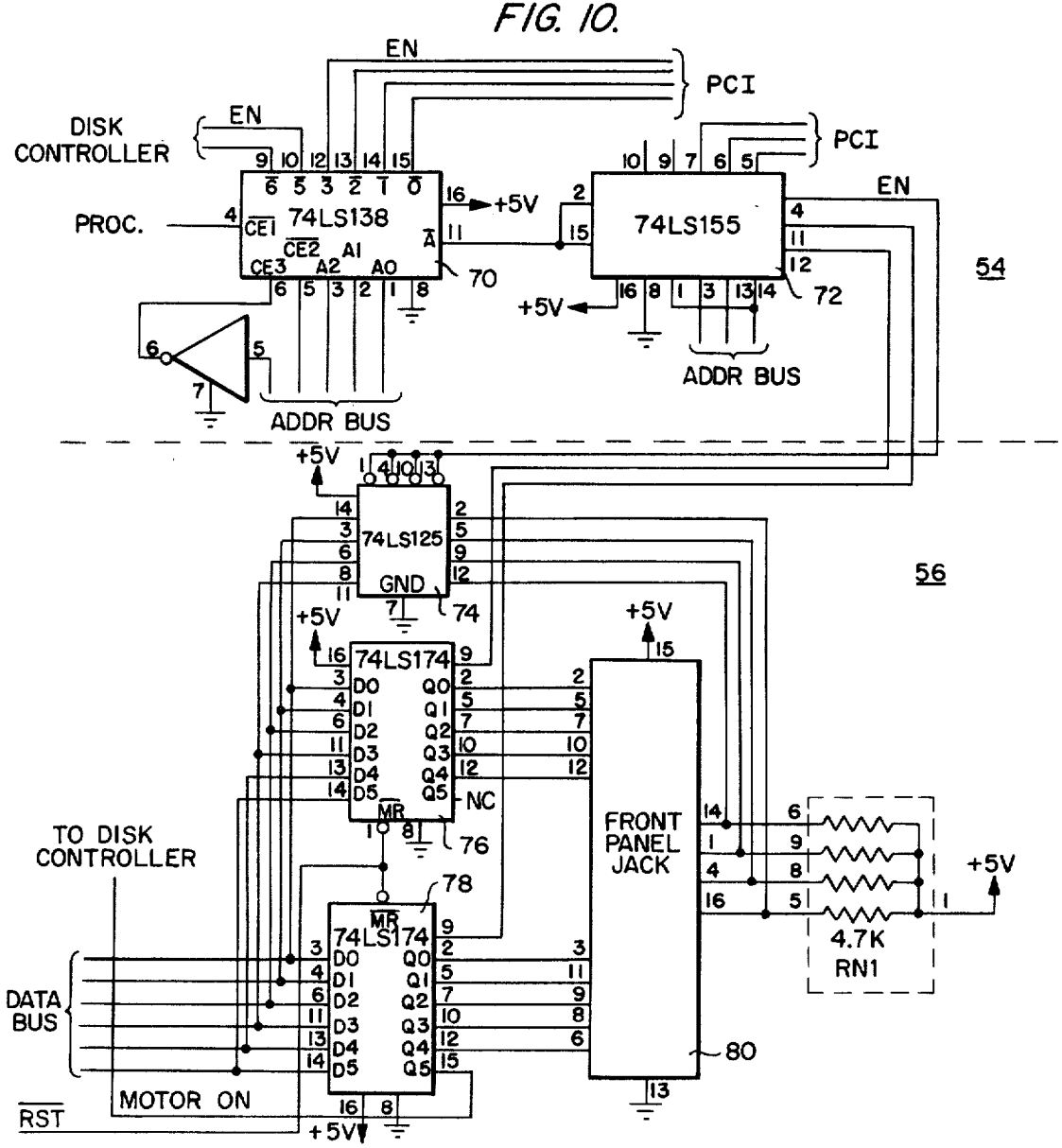
FIG. 10 is a circuit diagram of the I/O control circuit 54 and the front panel control circuit 56 of FIG. 3.

FIG. 10 illustrates the preferred circuit embodiments of the I/O control circuit 54 and the front panel control circuit 56. The I/O control circuit 54 includes a 3 to 8 line decoder/multiplexer 70 (TTL/74LS138) having select inputs connected to the address bus 46, having enable inputs connected to the processor 44 and the address bus 46, and having enable outputs connected to the disc controller 32 and the programmable communications interface unit 40. The enable outputs of the 3 to 8 line decoder/multiplexer 70 selectively enable the disk controller 32 and the ports of the programmable communications interface unit 40. The I/O control circuit 54 further includes a decoder/demultiplexer 72 (TTL/74LS155) which receives an enable output from the 3 to 8 line decoder/multiplexer 70 and a select input from the address bus 46, and which is connected to provide switch input enable signals to the programmable communications interface unit 40, and to provide an enable signal to the front panel control circuit 56.

The front panel control circuit 56 includes a bus buffer gate 74 connected to the decoder/demultiplexer 72 and to the data bus 48. The front panel control circuit 56 further includes a pair of hex D-type flip-flop circuits 76 and 78 (TTL74LS174). Each of the hex D-type flip-flops circuits 76 and 78 acts as a register and is connected to the data bus 48 and to a front panel jack 80 for connection to the front panel unit 34. The hex D-type flip-flop circuit 78 provides the MOTOR ON signal to the disk controller 32.

Figure 4:
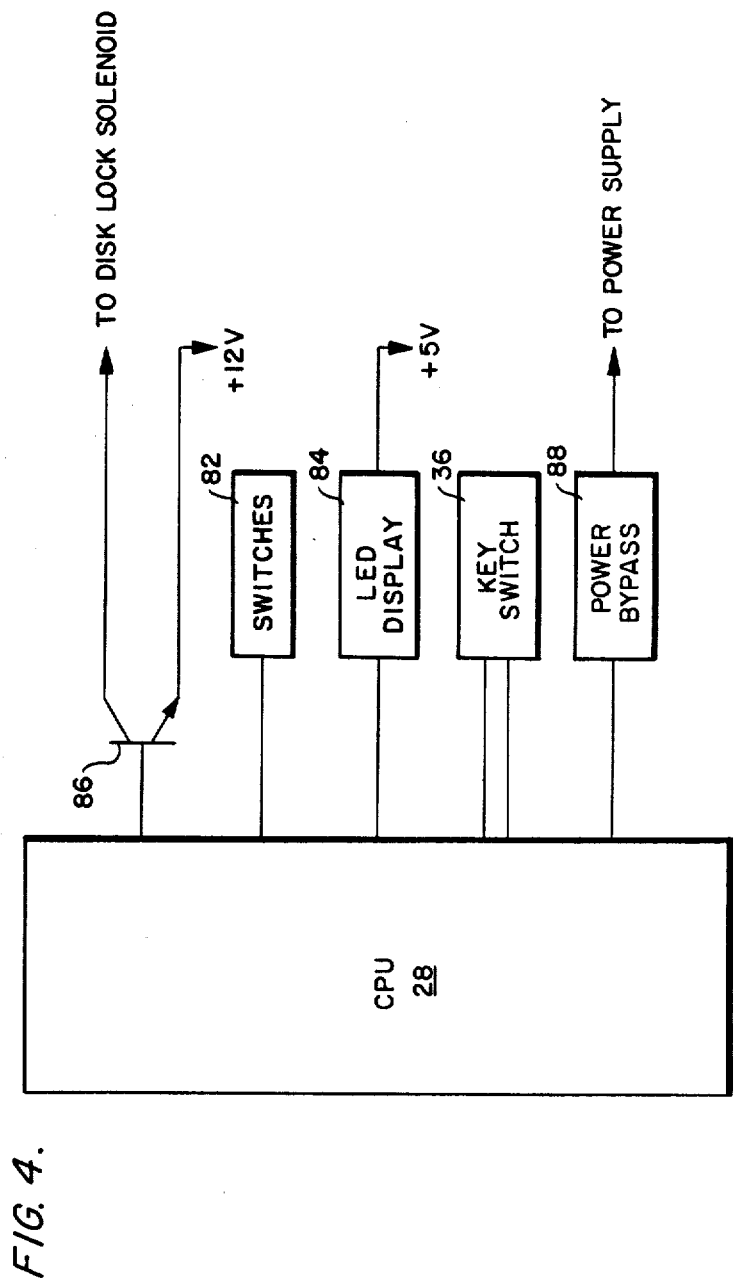
FIG. 4 is a block diagram illustrating the components of the front panel unit 34 of FIG. 2.

Referring to FIG. 4, the details of the front panel unit 34 will be described. The front panel unit 34 includes switches 82 and an LED display panel 84, both of which are connected to the CPU 28. The LED display panel displays BUSY, RUN, ERASE and ERROR messages for the operator. The BUSY message indicates that there is activity on the RS-232 link connected to the programmable communications interface unit 40. The RUN message indicates that the unit is available for interrogation by an external device. The ERASE message indicates that the unit is in a format mode, meaning that the disk is being erased and formatted. The ERROR message indicates that there is an error in I/O transmission, a disk reading error, or a defect in the floppy disk itself. The front panel 34 also has a power on/off light. The switch circuit 82 includes a RESET button, an ERASE button, a TRANSMIT button and a SPECIAL button. The RESET button is a software reset button which, upon actuation, causes the CPU 28 to go through an initialization procedure to put the system in a condition for operation. Actuation of the TRANSMIT button places the unit in an interrogation mode, establishes communications with the remote host computer 26 and off-loads the stored information under the control of the CPU 28. Actuation of the ERASE button causes the disk to be erased. The SPECIAL button may be actuated to call up a special program designed to fill the needs of a particular customer.

The key lock switch 36 transmits a lock signal to the CPU 28 which in turn generates a drive signal to drive a transistor 36, thereby causing a solenoid to lock the disk 31 in place during operation. A power bypass circuit 88 drives a relay in the power supply circuit 42 to prevent accidental power shut down by the operator during disk access operations.

Figure 5:
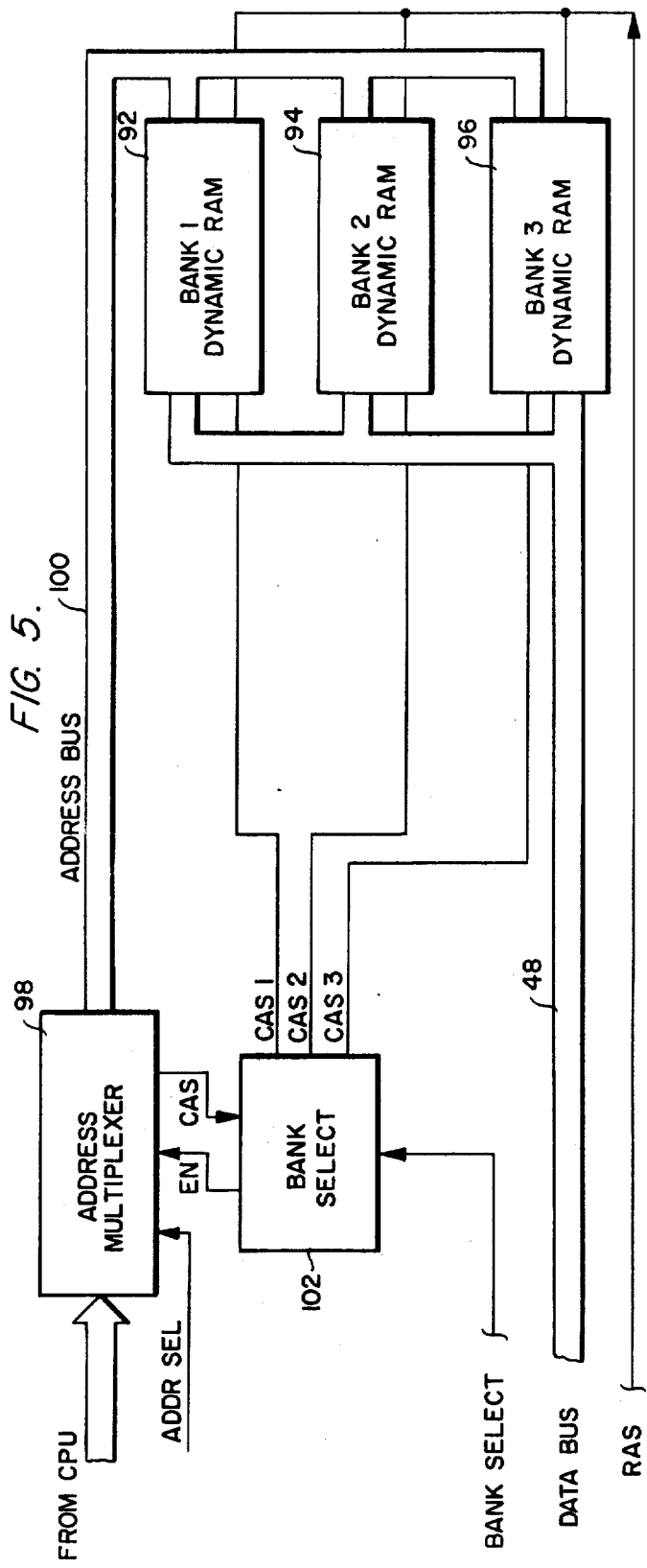
FIG. 5 is a block diagram illustrating the components of the dynamic memory 38 of FIG. 2.

Referring to FIG. 5, the dynamic memory 38 will be described. The dynamic memory 38 comprises a 48K dynamic RAM which provides storage for the sorting capability of the CPU 28. The dynamic memory 38 includes three dynamic RAM banks 92, 94 and 96, each of which has 16K bytes per bank. An address multiplexer 98 multiplexes 7 bits for a column address and 7 bits for a row address, and provides the multiplexed addresses to the dynamic RAM banks 92, 94 and 96 via an address bus 100. The dynamic RAM banks 92, 94 and 96 are connected to the processor 44 via the data bus 48. A bank select circuit 102 receives a bank select signal from the EPROM 64 (FIG. 9) and ANDs this signal with the chip enable for the address multiplexer 98 to generate the column address select signals CAS 1, CAS 2 and CAS 3 which are provided to the dynamic RAM banks 92, 94 and 96, respectively. The EPROM 64 also provides a row address select signal (RAS) to the dynamic RAM banks 92, 94 and 96 for row selection.

Figure 11:
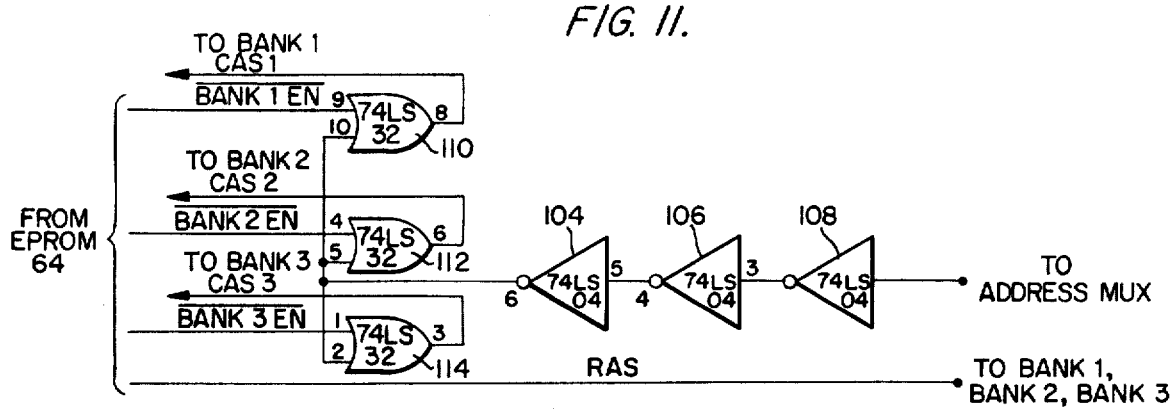
FIG. 11 is a circuit diagram of the bank select circuit 62 of FIG. 5.

The details of the bank select circuit 102 are best illustrated in FIG. 11. The bank select circuit 102 includes a series of three hex inverters 104, 106 and 108 (TTL/74LS04) which are used for delay purposes. The bank select circuit further comprises three OR gates 110, 112 and 114 all of which have, as one input, the output of inverter circuit 104. The other input of the OR gates 110, 112 and 114 is the bank select signal from the EPROM 64. The OR gates 110, 112 and 114 are employed as negative AND gates and provide, as outputs, the column address signals CAS 1, CAS 2 and CAS 3, respectively.

Figure 6:
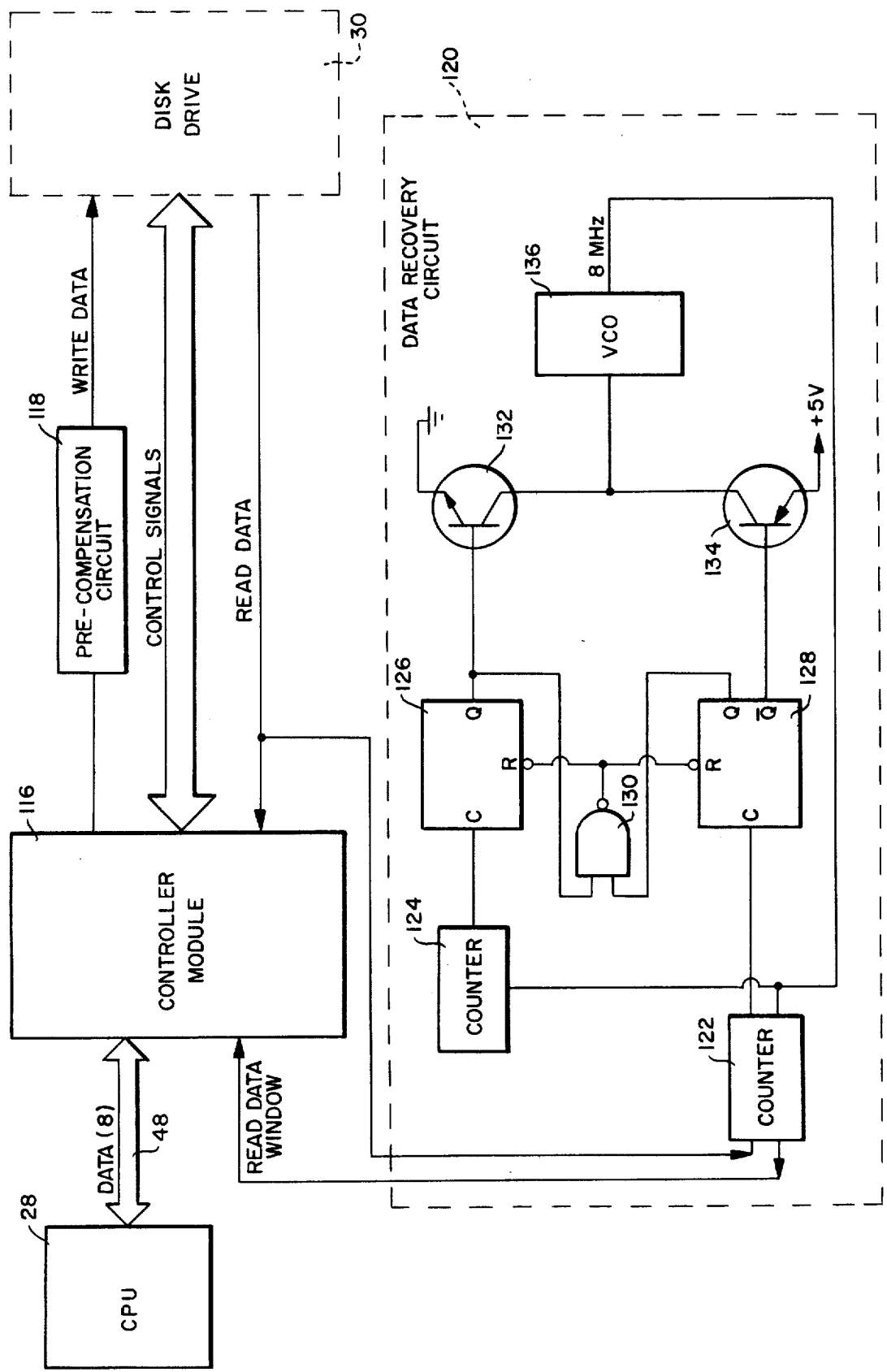
FIG. 6 is a diagram illustrating the components of the disk controller 32 of FIG. 2.

Referring to FIG. 6, the components of the disk controller 32 will be described. In the preferred embodiment, the disk controller is a Model No. 765 disk controller manufactured by NEC Microcomputers, Inc. The disk controller 32 includes a controller module 116 which is coupled to the CPU 28 via the data bus 48 and the I/O control circuit 54. The controller module 116 controls communications between the disk drive 30 and the CPU 28. A pre-compensation circuit 118 provides pre-compensation for write head hysteresis in the tracks closest to the center of the disk. A data recovery circuit, generally designated as 120, is employed during the disk read operation to compensate for frequency variations in the data being read. The data frequency can range from 125 KHz to 250 KHz due to the use of the modified frequency modulation (MFM) mode of writing data on the disk. Thus, it is necessary to track the frequency to establish a center frequency for the data being read. The data recovery circuit 120 is a phase-locked loop circuit which takes raw data from the disk by a phase encoded technique and creates a data window and a clocking mechanism to recover the information. The data recovery circuit 120 includes a counter 122 which is started by the read data from the disk drive 30. A free running counter 124 is used for count comparison with the counter 122. A pair of flip-flops 126 and 128 holds a 1 MHz count from the counters 124 and 122, respectively. A NAND gate 130 compares the counts of the counters 124 and 122 and resets the flip-flops 126 and 128 if the counts are equal. A pair of transistors 132 and 134 drive a voltage controlled oscillator 136 so as to change its frequency if a difference in count is detected by the NAND gate 130. This in turn causes the counter 122 to create a valid read data window for the controller module 116.

Figure 7:
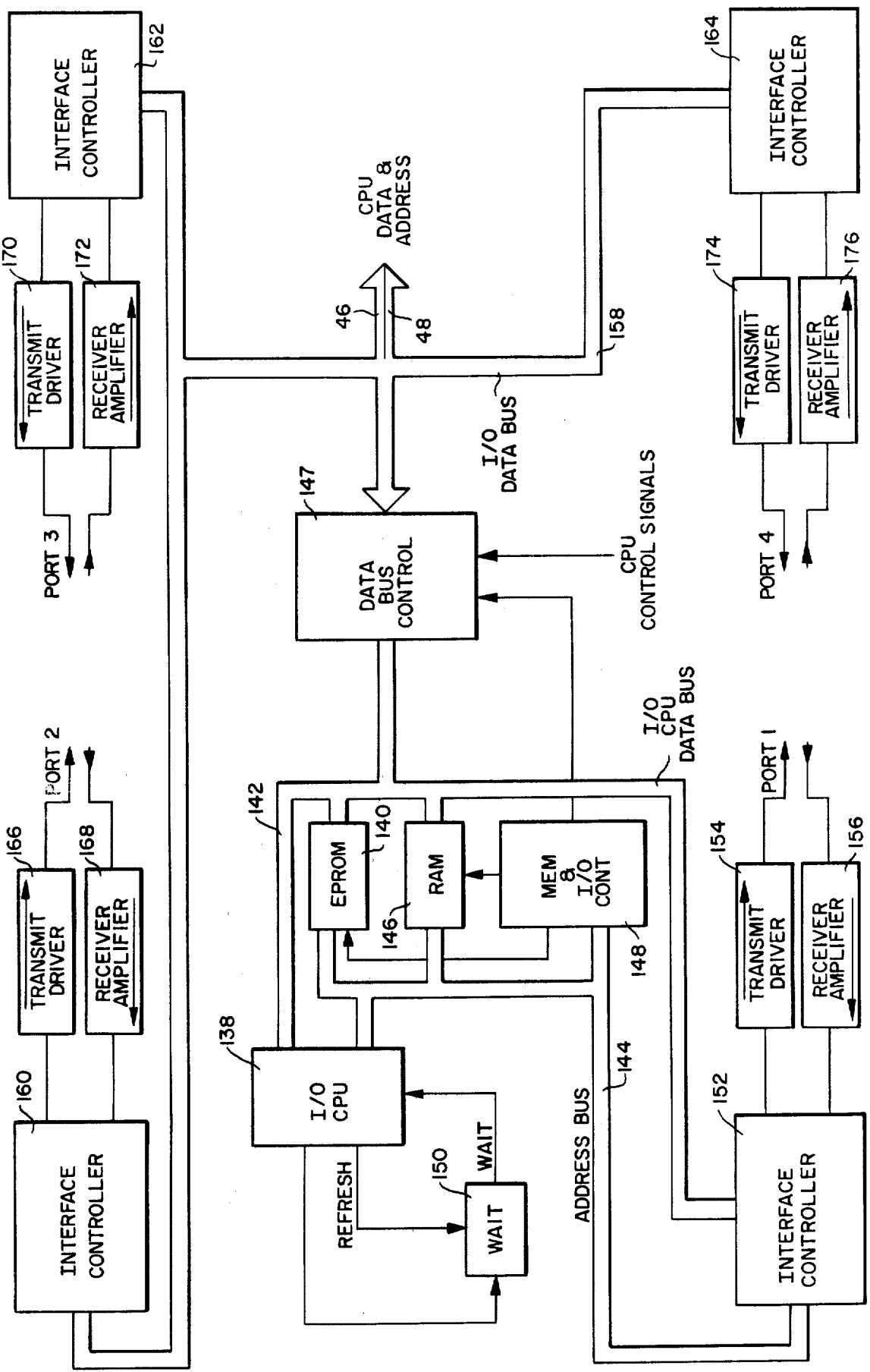
FIG. 7 is a diagram illustrating the components of the programmable communications interface unit 40 of FIG. 2.

Referring to FIG. 7, the programmable communications interface unit (PCI) 40 will be described. The PCI 40 is a programmable device which is capable of interfacing with external devices over RS-232C links. The PCI 40 has its own I/O CPU 138 so that it is capable of interfacing with computers manufactured by the IBM Corporation. If the remote host computer 26 is not an IBM computer then the I/O CPU 138 may be removed and a standard RS-232 interface (serial I/O) may be employed. The PCI 40 is capable of communicating in both synchronous and asynchronous data transfers via port 1 and in asynchronous data transfers via ports 2 through 4. Because of the amount of processing time and added circuitry required for synchronous communications, the PCI 40 requires its own I/O CPU 138. The I/O CPU 138 controls communications through port 1, employing a 2 MHz clock signal unless port 1 is communicating at greater than 9,600 baud. If port 1 is comunicating at greater than 9,600 baud then a 4 MHz clock signal is used. An erasable programmable read only memory (EPROM) 140 stores the program for the I/O CPU 138 and is connected to the I/O CPU 138 via an I/O CPU data bus 142 and an I/O address bus 144. In the preferred embodiment, the EPROM 140 is a 2K byte EPROM. A random access memory (RAM) 146 is used by the I/O CPU 138 for its housekeeping functions. A data bus control circuit 147 controls data transfers between the main CPU 28 and the I/O CPU 138 via data bus 48. A memory and I/O control circuit 148 uses four address lines to enable the RAM 146, the EPROM 140, port 1 or the data bus control circuit 147 at specific times under the control of the I/O CPU 138. In the preferred embodiment, the memory and I/O control circuit 148 comprises a dual 2 to 4 line decoder/multiplexer (TTL/74LS139). When the I/O baud rates exceed 9,600 baud, a 4 MHz clock is necessary to provide sufficient PROM access time. Therefore, a wait circuit 150 is employed when the I/O CPU 138 is strapped for 4 MHz operation. In the preferred embodiment, the wait circuit 150 comprises a pair of dual D-type edge triggered flip-flops (TTL/74LS74). The CPU data bus 142 and the address bus 144 are both connected to an interface controller circuit 152 for port 1. The interface controller circuit 152 is connected to a transmit driver circuit 154 and a receiver amplifier circuit 156. Port 1 is capable of synchronous communication and is the only port through which the I/O CPU 138 communicates. An I/O data bus 158 is connected to the data bus control circuit 147 and to three interface controller circuits 160, 162 and 164. The interface controller circuit 160 is connected to a transmit driver circuit 166 and a receiver amplifier circuit 168. Similarly, the interface controller circuit 162 is connected to a transmit driver circuit 170 and a receiver amplifier circuit 172. Ports 2 and 3 are capable of sending interrupts to the main CPU 28. In the preferred embodiment, the character reader 22 is connected to port 2 and the parcel register scale system 24 is connected to port 3. Port 4 is a standard port in which the interface controller circuit 164 is connected to a transmit driver circuit 174 and a receiver amplifier circuit 176. In the preferred embodiment, each of the interface controller circuits 152, 160, 162 and 164 comprises a standard 2651 interface controller circuit manufactured by Signetics, Inc.; the transmit driver circuits 154, 166, 170 and 174 are standard 1488 transmit drivers manufactured by National Semiconductor; and the receiver amplifier circuits 156, 168, 172 and 176 are standard 1489 receiver amplifier circuits manufactured by National Semiconductor. The interface controller circuits 152, 160, 162 and 164 receive data from the CPU 28 and I/O CPU 138 and convert it to serial information. The transmit driver circuits 154, 166, 170 and 174 and the receiver amplifier circuits 156, 168, 172 and 176 convert standard logic levels into RS-232C acceptable signals and vice versa, and are electrical buffers between the RS-232C bus and the interface controller circuits 152, 160, 162 and 164, respectively. The PCI 40 is such that it can convert ASCII to an IBM code and can provide the complex protocol necessary for communication between the data processing and storage system 20 and an IBM computer. A significant feature of the PCI 40 is that the program for the I/O CPU 138 is stored in EPROM 140 so that a program for use with a computer manufactured by IBM does not have to be off-loaded from a disk.

Figure 12:
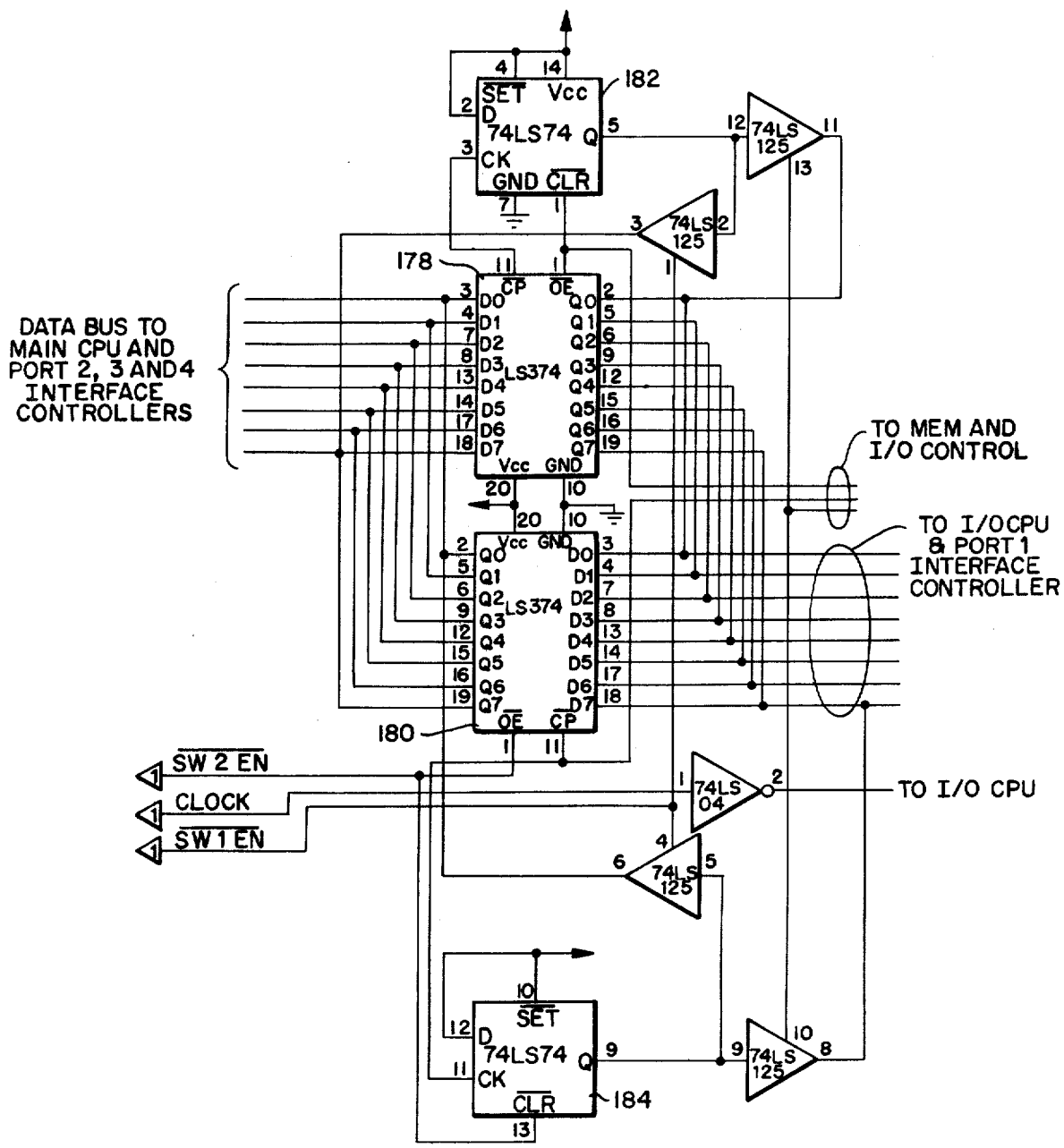
FIG. 12 is a circuit diagram of the data bus control circuit 147 of FIG. 7.

The components of the data bus control circuit 147 are best illustrated in FIG. 12. The data bus control circuit 147 includes a pair of octal D-type flip-flops 178 and 180 (TTL/74LS374) which are connected to the main CPU 28 via data bus 48 and to the interface controller circuits 160, 162 and 164 via I/O data bus 158. The octal D-type flip-flops 178 and 180 are also connected to the I/O CPU 138 and the interface controller circuit 152 via the CPU data bus 142. The data bus control circuit 147 further comprises a pair of dual D-type flip-flops 182 and 184 (TTL/74LS74) for providing a clock signal and a clear signal to the octal D-type flip-flops 178 and 180, respectively, to provide the handshaking sequence between the CPU 28 and the I/O CPU 138.

Figure 8:
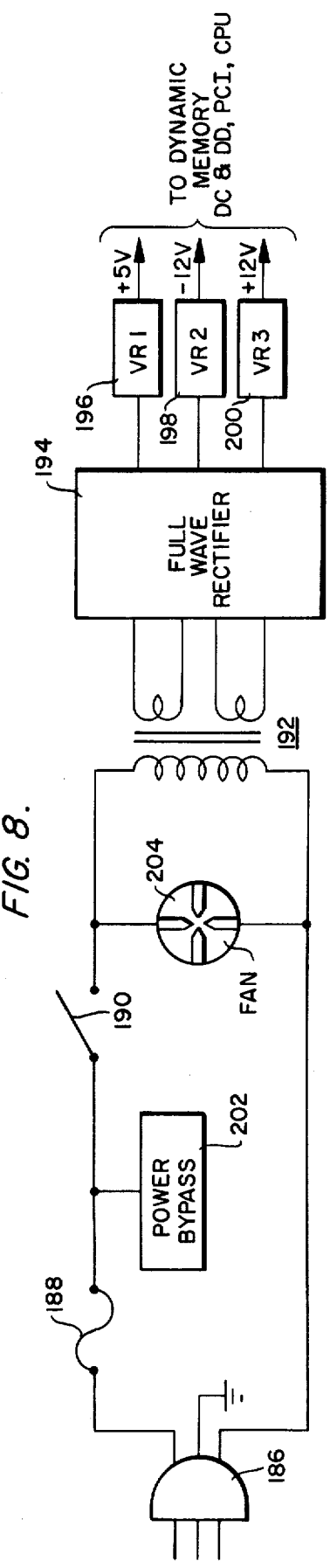
FIG. 8 is a diagram illustrating the components of the power supply circuit 42 of FIG. 2.

Referring to FIG. 8, the power supply circuit 42 will be described. The power supply circuit 42 includes an AC input 186, a fuse 188, an on-off power switch 190, a transformer 192, a full wave rectifier 194 and three voltage regulators 196, 198 and 200. The voltage regulator 196 provides +5 volts; the voltage regulator 198 provides −12 volts; and the voltage regulator 200 provides +12 volts. A power bypass circuit 202 is employed to prevent accidental power loss during disk access operations. A fan 204 is used to cool the entire data processing and storage system 20.

Figure 13:
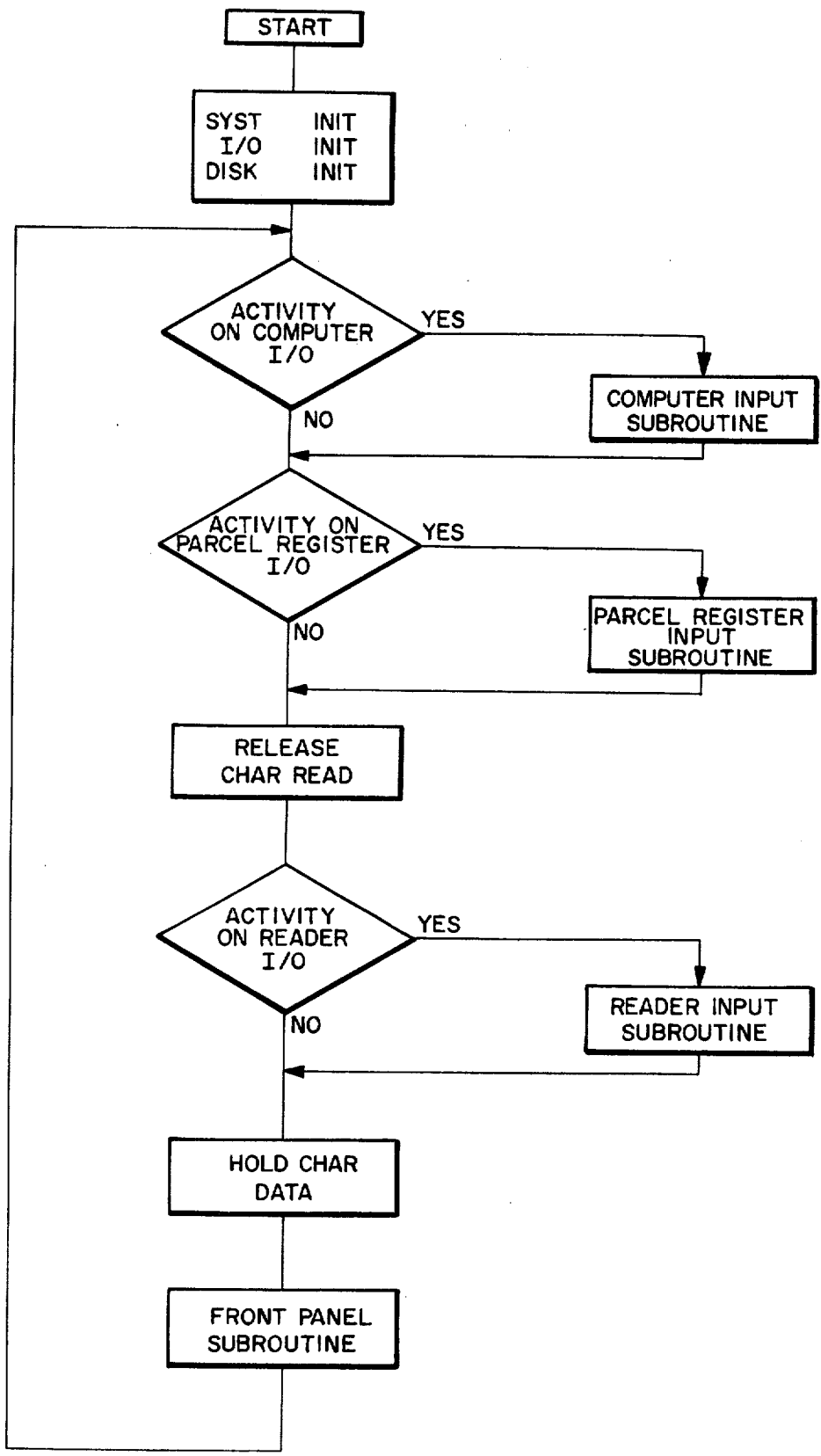
FIG. 13 is a flow chart for the data processing and storage system 20.

FIG. 13 is a flow chart for the data processing and storage system 20. The system is started (START) and the system, I/O and disk 31 are initialized (SYST INIT, I/O INIT, DISK INIT). The CPU 28 then determines whether there is any activity on port 1 (ACTIVITY ON COMPUTER I/O). If there is activity on port 1, then the system performs the computer input subroutine (COMPUTER INPUT SUBROUTINE). After the computer input subroutine returns to the main routine, or if there is no activity on port 1, the CPU 28 determines whether there is any activity on port 3 (ACTIVITY ON PARCEL REGISTER I/O). If there is activity on port 3, then the parcel register input subroutine is performed (PARCEL REGISTER INPUT SUBROUTINE). After the parcel register input subroutine has returned to the main routine, or if there is no activity on port 3, the character reader 22 is released (RELEASE CHAR READ). The character reader 22 requires a special release mechanism in order to release it to receive data. After the character reader 22 has been released, the CPU 28 determines whether there is any activity on port 2 (ACTIVITY ON READER I/O). If there is activity on port 2, then the reader input subroutine is performed (READER INPUT SUBROUTINE). Then after data has been successfully inputted, the wand is prevented from receiving any additional inputs until the system is rechecked (HOLD CHAR DATA). Next, the front panel subroutine is performed (FRONT PANEL SUBROUTINE) and the system then returns to check for activity on the ports again. Thus, the data processing and storage system 20, under the control of the CPU 28, is continuously looping to check for activity on the I/O ports and the front panel. The various subroutines illustrated in FIG. 13 will be described in detail in FIGS. 14-18.

Figure 14:
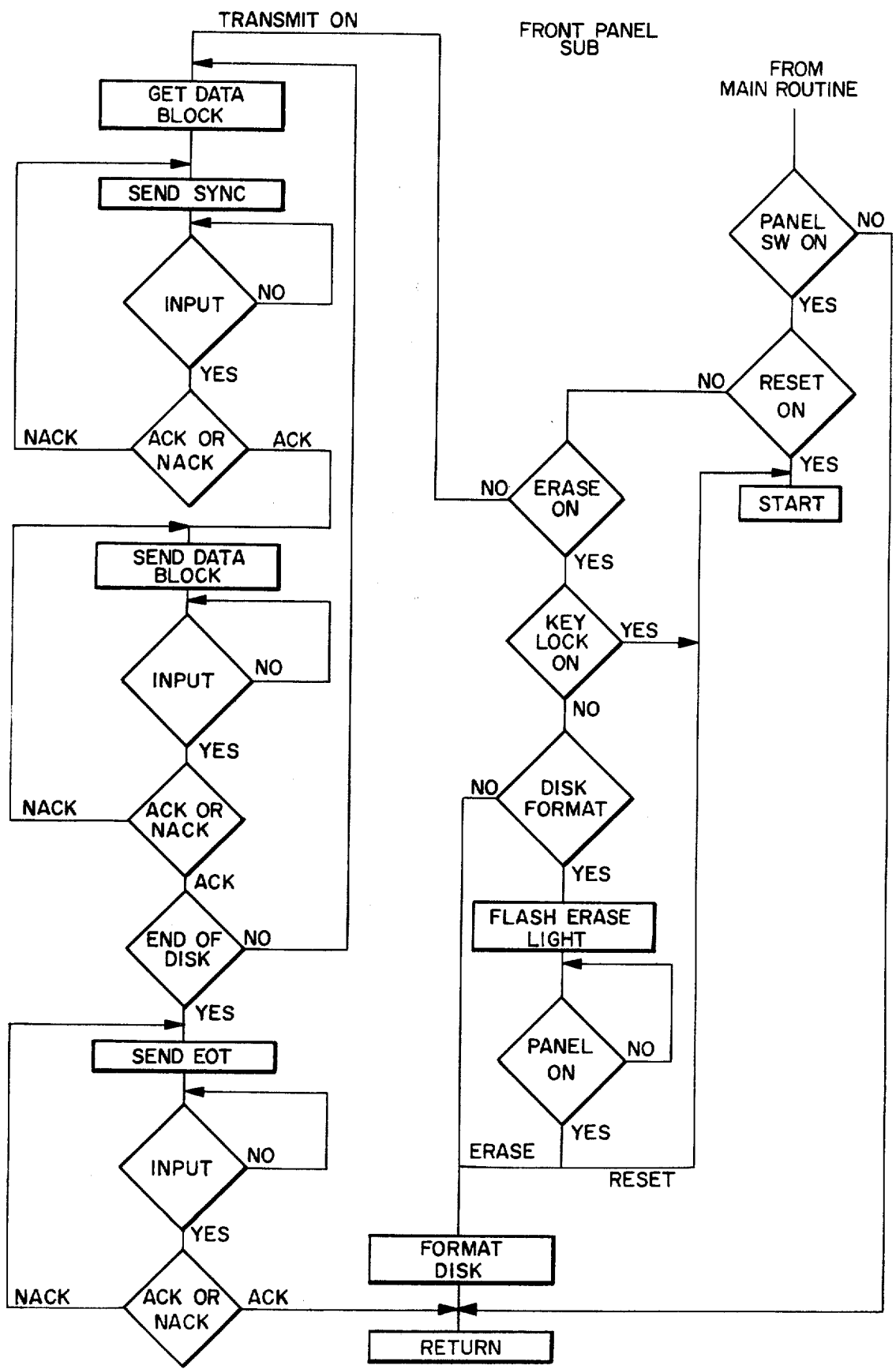
FIG. 14 is a flow chart for the front panel subroutine of FIG. 13.

FIG. 14 is a flow chart for the front panel subroutine. When the front panel subroutine is called, the CPU 28 determines whether any of the panel switches are on (PANEL SW ON). If no panel switches are on then the front panel subroutine returns to the main routine. If any of the panel switches are on, the CPU 28 then determines whether the RESET switch is on (RESET ON). If the RESET switch is on then the system is returned to the start of the main program and goes through an initialization (START). If the RESET switch is not on the CPU 28 determines whether the erase switch is on (ERASE ON). If the ERASE switch is on the CPU 28 determines whether the key lock switch 36 is on (KEY LOCK ON). If the key lock switch 36 is on then the system is returned to start and is reinitialized (START). If the key lock switch is locked, it is an indication that the disk is to be protected against any accidental erasures. If the key lock switch is not on, the CPU 28 then checks the disk to determine whether the disk has been formatted (DISK FORMAT). If the disk has not been formatted, then it is formatted (FORMAT DISK) and the subroutine is returned to the main routine (RETURN). If the disk is a formatted disk, the operator is warned by a flashing erase light (FLASH ERASE LIGHT). The CPU 28 then rechecks to see whether any panel switches are still on (PANEL ON). If the ERASE switch is still on, this indicates that the operator desires to erase the disk even though it is a formatted disk and the disk is erased and formatted (FORMAT DISK). If the operator has accidentally pressed the ERASE switch, then when the operator sees the flashing erase light the operator will press the RESET button and return the system to start. If a panel switch is on but neither the RESET switch nor the ERASE switch is on, then the TRANSMIT switch must be on (assuming there is no special subroutine). If so, the CPU 28 gets the first block of data from the disk (GET DATA BLOCK) and sends a sync character to the remote host computer 26 (SEND SYNC). The sync character is sent in order to establish a protocol with the remote host computer 26. The CPU 28 then waits until the remote host computer 26 responds to the sync character by remaining in a loop and determining whether an input has been received (INPUT). Once an input is received, then the CPU 28 determines whether it is an acknowledge signal or a not acknowledge signal (ACK OR NACK). If the input is a not acknowledge signal then the system loops back and resends the sync character. If the input is an acknowledge signal (indicating that the host computer 26 is ready to receive data) the data block is then transmitted to the host computer 26 (SEND DATA BLOCK). The CPU 28 then waits to receive an input from the host computer 26 acknowledging the receipt of the data block (INPUT). The CPU 28 determines whether the input received is an acknowledge or a not acknowledge signal (ACK OR NACK) and if it is a not acknowledge signal the CPU 28 resends the same data block. If an acknowledge signal is received, the CPU 28 then determines whether the end of the disk has been read yet (END OF DISK). If the end of the disk has not been read yet the CPU 28 reads another block of data from the disk (GET DATA BLOCK) and repeats the transmission loop. If the end of disk has been read, the CPU 28 then sends an end of transmission code to the host computer 26 (SEND EOT). The CPU 28 then waits for the host computer 26 to respond with an acknowledge or not acknowledge signal (ACK OR NACK). If a now acknowledge signal is received, then the end of transmission code is retransmitted until an acknowledgdment signal is received. When an acknowledgement signal is received, the subroutine returns to the main routine (RETURN).

Figure 15:
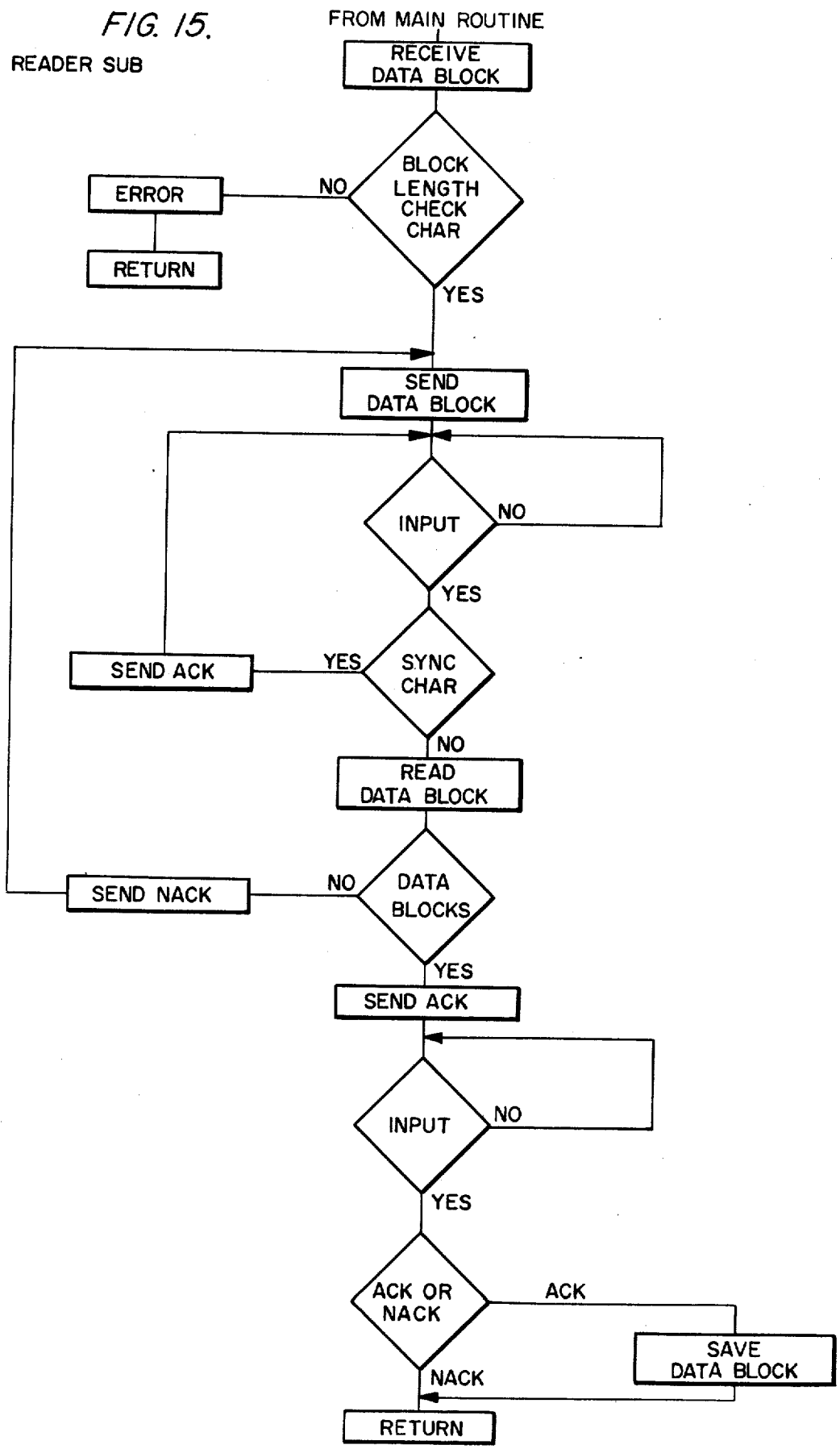
FIG. 15 is a flow chart for the leader input subroutine of FIG. 13.

FIG. 15 is a flow chart for the reader input subroutine. In the reader subroutine, a data block is received (RECEIVE DATA BLOCK) and the CPU 28 compares the block length to a check character (BLOCK LENGTH CHECK CHAR). If the length of the data block received is not correct, an error is generated (ERROR) and the subroutine returns to the main routine. If the length of the data block is correct, the CPU 28 sends the data block over port 3 to the parcel register scale system 24 (SEND DATA BLOCK) while storing the data block in the static RAM 51. The CPU 28 then waits for a response from the parcel register scale system 24 (INPUT) and, once an input is received, the CPU 28 determines whether it is a sync character (SYNC CHAR). If it is a sync character, an acknowledgement signal is sent to the parcel register scale system 24 and the CPU 28 waits for another input (SEND ACK). If the input is not a sync character, the CPU 28 then determines that valid data is being received and the data block is read (READ DATA BLOCK) and is compared with the data block which is stored in the static RAM 51 (DATA BLOCKS). If the data blocks do not check out, a not acknowledge signal is sent to the parcel register scale system 24 (SEND NACK) and the subroutine loops back and resends the data block to the parcel register scale system 24. If a correct comparison is made, an acknowledge signal is sent to the parcel register scale system 24 (SEND ACK) and the CPU 28 waits for an acknowledge signal from the parcel register scale system 24 (INPUT and ACK OR NACK). If a not acknowledge signal is received, this means that the parcel register scale system 24 has not generated a label and the data will not be stored on the disk 31. If an acknowledge signal is received, the data block is stored on the disk 31 (SAVE DATA BLOCK) and the subroutine is returned to the main routine.

Figure 16:
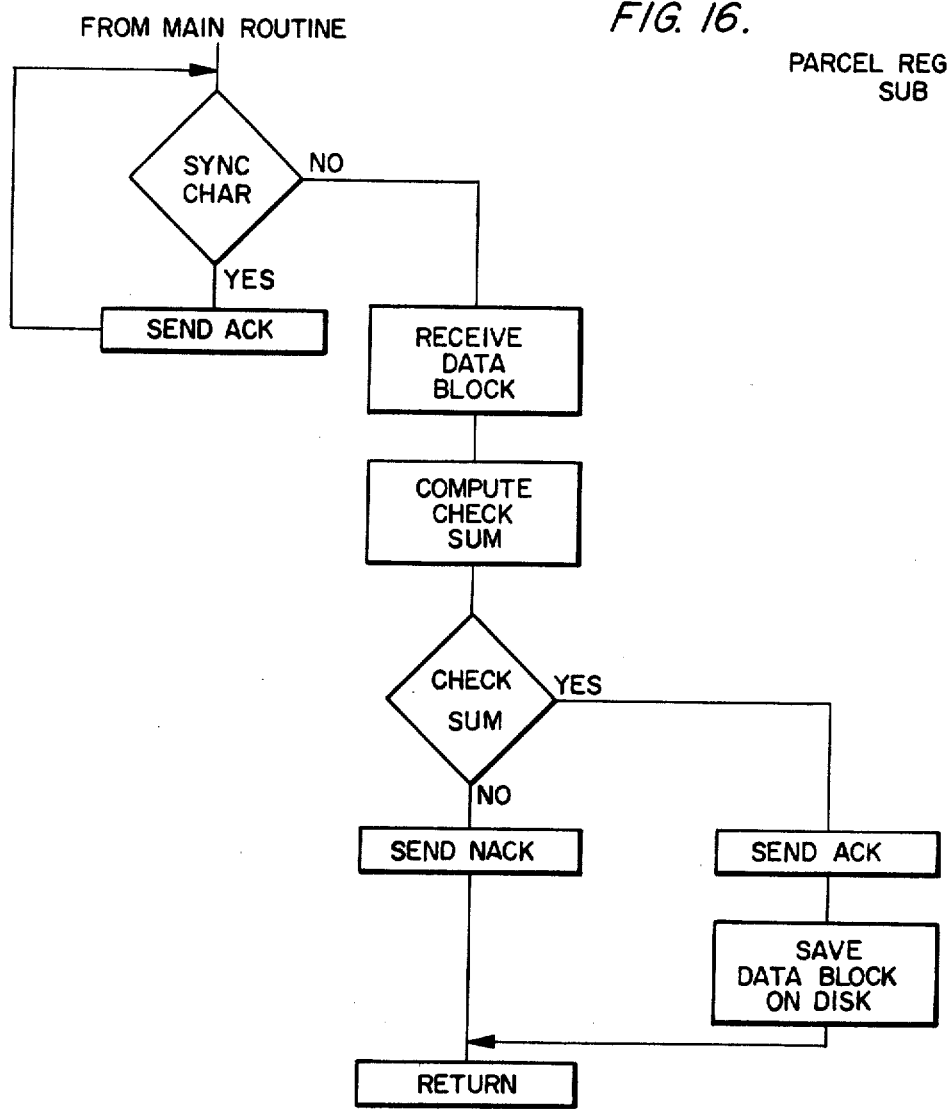
FIG. 16 is a flow chart for the parcel register input subroutine of FIG. 13.

FIG. 16 illustrates the parcel register input subroutine. In this mode of operation, it is not necessary that a character reader 22 be employed. Thus, the CPU 28 recognizes activity on the I/O port 3 and will receive data from the parcel register postal scale system 24. When the system goes into the parcel register input subroutine, the CPU 28 checks the input to determine whether it is a sync character (SYNC CHAR). If it is a sync character, an acknowledgement signal is sent to the parcel register scale system 24 (SEND ACK). If it is not a sync character, the CPU 28 then receives data from the parcel register scale system 24 (RECEIVE DATA BLOCK). Then the CPU 28 computes a check sum (COMPUTE CHECK SUM) and determines whether the check sum is correct (CHECK SUM). In effect, the CPU 28 checks to make sure that the data block has been correctly received. If the check sum is not correct, a not acknowledge signal is sent to the parcel register scale system 24 (SEND NACK) and the subroutine returns to the main routine. If the computed check sum is correct, an acknowledge signal is sent to the parcel register scale system 24 (SEND ACK), the data block is recorded on the disk 31 (SAVE DATA BLOCK ON DISK) and the subroutine returns to the main routine (RETURN). The parcel register subroutine is useful not only when the data processing and storage system 20 is operating without a character reader 22, but also when a particular shipping label on a parcel is sufficiently multilated so that it cannot be read by the character reader 22. If this is the case, then the operator can input data through the parcel register scale system 24 and this data can then be transmitted via port 3 to the data processing and storage system 20.

Figure 17:
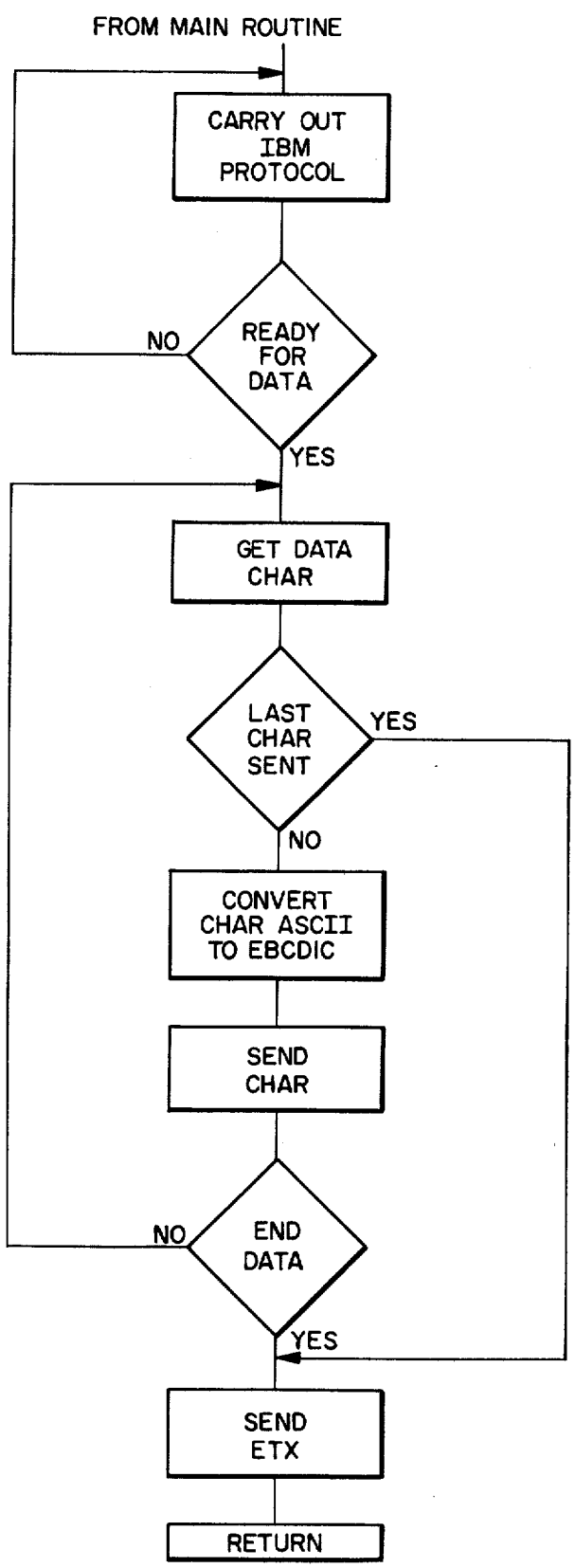
FIG. 17 is a flow chart for the computer input subroutine of FIG. 13 when the programmable communications interface circuit 40 is employed to communicate with IBM computers.

FIG. 17 illustrates the computer input subroutine when the PCI 40 is to be employed to communicate with an IBM host computer 26. In this situation, the I/O CPU 138 of the PCI 40 carries out the IBM protocol (CARRY OUT IBM PROTOCOL). As noted above, when the remote host computer 26 is an IBM computer, the CPU 28 cannot be used to communicate directly with the host computer 26 because of the time requirements for such communication. Thus, the additional I/O CPU 138 is required. After the IBM protocol has been carried out, the I/O CPU 138 determines whether the remote host computer 26 is ready to receive data (READY FOR DATA). If it is not ready to receive the data, the protocol is carried out once again. If the host computer 26 is ready to receive data, the CPU 28 then reads data from the disk 31. The I/O CPU 138 then determines whether the last character has been sent (LAST CHAR SENT). If the last character has been sent, an end of text signal is sent to the host computer 26 (SEND ETX) and the subroutine returns to the main routine (RETURN). If the last character has not been sent, the I/O CPU 138 then converts the ASCII characters to IBM readable code (CONVERT CHAR ASCII TO EBCDIC) and transmits the data to the remote host computer 26 via port 1 (SEND CHAR). The I/O CPU 138 then determines whether all of the data has been sent (END DATA) and, if not, more data is read for transmission to the remote host computer 26. If all data has been sent, then an end of text signal is sent to the remote host computer 26 (SEND ETX) and the subroutine is returned to the main routine (RETURN).

Figure 18:
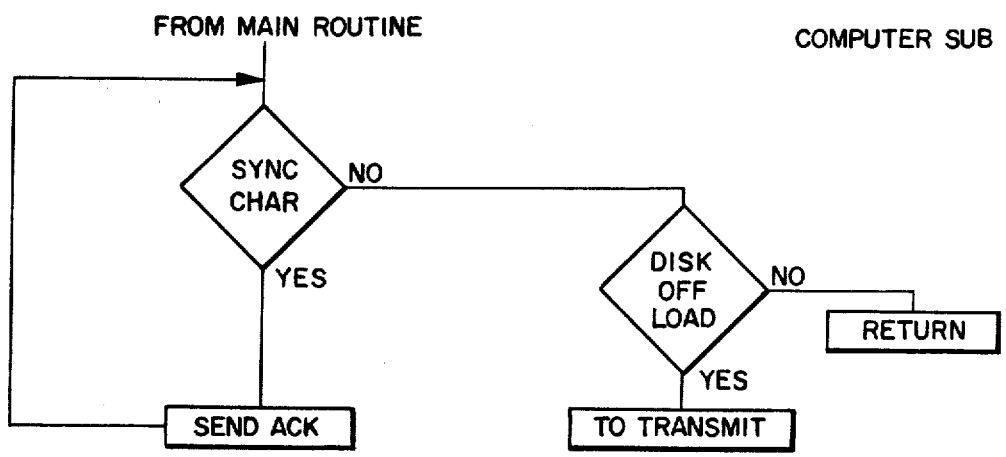
FIG. 18 is a flow chart for the computer input subroutine of FIG. 13 when only a serial I/O is necessary to communicate with the remote host computer 26.

FIG. 18 illustrates an alternative flow chart for the computer input subroutine for the embodiment where only a serial I/O is required to communicate with the remote host computer 26. In this situation, the additional I/O CPU 138 is not required and the CPU 28 may carry out communications with the remote host computer 26. The CPU 28 determines whether a sync character has been received and if it has, then an acknowledgement signal is sent to the remote host computer 26 (SEND ACK). If a sync character has not been received, the CPU 28 then determines whether a disk off-load command has been received (DISK OFF LOAD). If a disk off-load command has not been received, the subroutine is returned to the main routine (RETURN). If a disk off-load command has been received, the CPU 28 then places the system in the transmit portion of the front panel subroutine (FIG. 14). Thus, it can be seen that transmission to the remote host computer can be accomplished in two ways. The operator can actuate transmission of data to the remote host computer 26 by pressing the TRANSMIT button on the front panel (FIG. 14). In addition, the remote host computer 26 can interrogate the data processing and storage system 20 to place the data processing and storage 20 into a transmit mode (FIG. 17 or 18).

Referring to FIGS. 1 and 2, the operation of the system of the present invention will be described. The character reader 22 is employed to read single or multiple lines of characters on a shipping label on a parcel or a shipping document and to generate a character information signal, including character data, which is sent to the data processing and storage system 20 via port 2 of the PCI 40. The data processing and storage system 20 does not immediately store the character data on the disk 31 but temporarily stores the character data in its static RAM 51 and transmits the character data to the parcel register scale system 24 via port 3 of the PCI 40. The parcel register scale system 24 weighs the parcel and transmits a signal, including both the character data and weight and charge data, to the CPU 28 of the data processing and storage system 20, via port 3 of the PCI 40. The CPU 28 then compares the character data stored in its static RAM 51 to the character data which is received from the parcel register postal scale system 24 to make sure that the two sets of data correspond. If the two sets of character data correspond, an acknowledgment signal is sent to the parcel register scale system 24 which completes the transaction by printing a label, incrementing its ascending or descending registers and erasing its memory. In addition, the parcel register scale system 24 sends an acknowledge signal to the data processing and storage system 20. Upon receiving the acknowledge signal, the transaction data, including the character data and the charge and weight data, is encoded and stored on the disk 31. When the transaction data is stored on the disk 31 a standard read after write check is made to insure that the data was correctly recorded on the disk. If the two sets of character data do not correspond, the CPU 28 then sends an error signal to the parcel register scale system 24 and generates an ERROR display on the LED display of the front panel 34 of the data processing and storage system 20.

At a selected time the remote host computer 26 interrogates the data processing and storage system 20 and the transaction data stored on the disk 31 is read from the disk 31 and transmitted to the host computer 26 for further processing by the remote host computer 26.

The system of the present invention may be implemented in numerous ways. Instead of using an OCR reader, the shipping label may be coded in any suitable manner and read by any compatible code reading device. For example, a magnetic code and magnetic code reader, or a bar code and bar code reader, may be employed instead of the character reader 22. Similarly, the disk 31 may be replaced with any suitable semi-permanent memory, for example, magnetic tape, punched tape or a magnetic bubble memory.

The many features and advantages of the invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation shown and described and, accordingly, all suitable modifications and equivalents may be resorted to, falling within the scope of the invention.

What is claimed is:

1. A data processing and storage system for processing and storing transaction data relating to a plurality of parcels and for transmitting the transaction data to a remote host computer, comprising:
    means for providing a character information signal including character data;
    means for providing a scale data signal including scale data;
    a programmable communications interface unit, operatively connected to said means for providing a character information signal, said means for providing a scale data signal, and to the remote host computer, for receiving said character information signal and said scale data signal, and for providing, as an output, said character data and said scale data;
    a central processing unit, operatively connected to said programmable communications interface unit, for providing an I/O control signal to said programmable communications interface unit, for processing the transaction data comprising said character data and said scale data, for sorting the transaction data, for providing, as an output to be stored, the transaction data, and for generating a read signal;
    a dynamic memory, operatively connected to said central processing unit, for use as temporary storage by said central processing unit when said central processing unit is sorting the transaction data; and
    semi-permanent memory means, operatively connected to said central processing unit, for storing the transaction data processed by said central processing unit and for reading out the stored transaction data to said central processing unit in dependence upon said read signal, whereupon said central processing unit provides the transaction data to said programmable communications interface unit for transmission to the remote host computer.

2. A data processing and storage system as set forth in claim 1, wherein said programmable communications interface unit comprises:
    an I/O central processing unit for controlling the operations of said programmable communications interface unit;
    an I/O address bus coupled to said I/O central processing unit;
    an I/O CPU data bus coupled to said I/O central processing unit;
    a PROM operatively connected to said I/O address bus and said I/O CPU data bus;
    a RAM operatively connected to said I/O address bus and said I/O CPU data bus;
    a memory and I/O control circuit, operatively connected to said I/O address bus, said PROM and said RAM, for decoding address signals on said address bus, for selectively generating enable signals for said PROM and said RAM, and for generating a data bus control enable signal;
    a data bus control circuit, operatively connected to said I/O CPU data bus, said memory and I/O control circuit and said central processing unit, for controlling communications between said I/O central processing unit and said central processing unit under the control of said data bus control enable signal and said central processing unit;
    an I/O data bus, operatively connected to said data bus control circuit and to said central processing unit;
    a first port, operatively connected to said I/O address bus and said I/O CPU data bus, said first port providing synchronous communication under the control of said I/O central processing unit;
    a second port operatively connected to said I/O data bus; and
    a third port operatively connected to said I/O data bus.

3. A data processing and storage system as set forth in claim 2, wherein said first port comprises:
    a first interface controller circuit operatively connected to said I/O address bus and to said I/O CPU data bus;
    a first transmit driver circuit, operatively connected to said first interface controller circuit, for use as the output of said first port; and
    a first receiver amplifier circuit, operatively connected to said first interface controller circuit, for use as the input of said first port, and wherein said second and third port each comprise:

an interface controller circuit operatively connected to said I/O data bus;

a transmit driver circuit, operatively connected to said interface controller circuit for use as a port output; and a receiver amplifier circuit, operatively connected to said interface controller circuit, for use as a port input.

4. A data processing and storage system as set forth in claim 2 or 3, wherein said first port is operatively connected to the remote host computer, wherein said second port is operatively connected to said means for providing a character information signal, and wherein said third port is operatively connected to said means for providing a scale data signal.

5. A data processing and storage system as set forth in claim 1, wherein said central processing unit comprises:

a processor;

an address bus coupled to said processor, said programmable communications interface unit and said dynamic memory;

a data bus coupled to said processor, said programmable communications interface unit and said dynamic memory;

a PROM operatively connected to said address bus and said data bus;

a RAM operatively connected to said address bus and said data bus;

a memory decode circuit, operatively connected to said address bus, said PROM and said RAM, for decoding address signals on said address bus and for selectively generating enable signals; and an I/O control circuit, operatively connected to said address bus, said programmable communications interface unit, and said semi-permanent memory means, for providing said read signal to said semi-permanent memory means and for providing said I/O control signal to said programmable communications interface unit.

6. A data processing and storage system as set forth in claim 1, further comprising:

a front panel unit operatively connected to said central processing unit, said front panel unit including a display panel for displaying the status of the data processing and storage system and a switch panel for operator control of the data processing and storage system.

7. A data processing and storage system as set forth in claim 6, wherein said central processing unit comprises:

a processor;

an address bus coupled to said processor, said programmable communications interface unit and said dynamic memory;

a data bus coupled to said processor, said programmable communications interface unit, said dynamic memory and said semi-permanent storage means;

a PROM operatively connected to said address bus and said data bus;

a RAM operatively connected to said address bus and said data bus;

a memory decode circuit, operatively connected to said address bus, said PROM, and said RAM, for decoding the address signals on said address bus and for selectively generating enable signals;

an I/O control circuit, operatively connected to said address bus, said semi-permanent memory means, and said programmable communications interface unit, for providing said read signal to said semi-permanent memory means, for providing said I/O control signal to said programmable communications interface unit and for providing a front panel signal; and a front panel control circuit, operatively connected to said data bus, said semi-permanent memory means, said I/O control circuit, and said front panel unit, for receiving said front panel signal from said I/O control circuit, for providing a front panel control signal to said front panel circuit, and for providing a MOTOR ON signal to said semi-permanent memory means.

8. A data processing and storage system as set forth in claim 5 or 7, wherein said PROM is an erasable programmable read only memory.

9. A data processing and storage system as set forth in claim 7, wherein said central processing unit further comprises:

a clock circuit, operatively connected to said processor, for providing a first clock signal to said processor and for providing a second clock signal; and a wait circuit, operatively connected to said processor, said clock circuit, and said memory decode circuit, for receiving said second clock signal from said clock circuit and for providing a wait signal to said processor and said memory decode circuit.

10. A data processing and storage system as set forth in claim 6, wherein said front panel unit comprises:

a plurality of operator control switches operatively connected to said central processing unit;

an LED display panel operatively connected to said central processing unit;

a key operated switch, operatively connected to said central processing unit, for providing access to said data processing and storage system only by authorized operators and for preventing accidental erasure of said semi-permanent storage means; and a power bypass circuit, operatively connected to said central processing unit, for preventing accidental power shutdown when said semi-permanent storage means is being accessed.

11. A data processing and storage system as set forth in claim 1, wherein said dynamic memory comprises a random access memory.

12. A data processing and processing system as set forth in claim 1, wherein said central processing unit generates a bank select signal and a row address select signal, and wherein said dynamic memory comprises:

an address multiplexer operatively connected to said central processing unit;

an address bus coupled to said address multiplexer;

first, second and third random access memory banks coupled to said address bus and operatively connected to said central processing unit for receiving said row address select signal; and a bank select circuit, operatively connected to said address multiplexer, said central processing unit and said first, second and third random access memory banks, for receiving said bank select signal from said central processing unit and for providing a first column address signal to said first random access memory bank, a second column address signal to said second random access memory bank and a third column address signal to said third random access memory bank, in dependence upon said bank select signal from said central processing unit.

13. A data processing and storage system as set forth in claim 1, wherein said semi-permanent memory means comprises a disk storage unit.

14. A data processing and storage system as set forth in claim 13, wherein said disk storage unit comprises:
a floppy disk;
a disk controller circuit, operatively connected to said central processing unit, for receiving said read signal and for generating disk control signals; and
a disk drive circuit, operatively connected to said disk controller circuit, for receiving said disk control signals and for driving said floppy disk.

15. A method of processing and storing transaction data relating to a plurality of parcels, comprising the steps of:
generating a character information signal including character data;
generating a scale data signal including scale data;
sorting the character data and scale data;
storing the character data and scale data as transaction data on a disk;
reading the transaction data from the disk; and
transmitting the transaction data to a remote host computer.

16. A method of processing and storing transaction data relating to a plurality of parcels, comprising the steps of:
reading character data and generating a character information signal including the character data;
weighing a parcel and generating a scale data signal including scale data;
storing the character data and scale data on a disk as transaction data;
reading the transaction data from the disk; and
transmitting the transaction data to a remote host computer.

17. A method as set forth in claim 16, further comprising the step of displaying a store signal when said storing step is occurring and displaying a transmit signal when said transmitting step is occurring.

18. A method of processing and storing transaction data relating to a plurality of parcels, comprising the steps of:
generating a character information signal including character data;
temporarily storing the character data in a data processing and storage system while simultaneously transmitting said character data to a parcel register system;
generating a scale data signal including scale data and transmitting a signal, including the character data and the scale data, to the data processing and storage system;
comparing the character data temporarily stored in the data processing and storage system to the character data received from the parcel register system;
storing the character data and scale data as transaction data on the disk;
generating an access signal;
reading the transaction data from the disk in response to the access signal; and
transmitting the transaction data to a remote host computer.

* * * * *

UNITED STATES PATENT AND TRADEMARK OFFICE
CERTIFICATE OF CORRECTION

PATENT NO. : 4,420,819
DATED : DECEMBER 13, 1983
INVENTOR(S) : ROBERT J. PRICE ET AL.

It is certified that error appears in the above-identified patent and that said Letters Patent is hereby corrected as shown below:

Col. 10, line 59, "now" should be --not--.

Signed and Sealed this

Twenty-fourth Day of April 1984

[SEAL]

Attest:

GERALD J. MOSSINGHOFF

Attesting Officer — Commissioner of Patents and Trademarks